United States Patent
Coste et al.

(10) Patent No.: US 12,529,342 B2
(45) Date of Patent: Jan. 20, 2026

(54) METHOD FOR DETERMINING A PREDICTIVE MODEL OF A PRESSURE RATIO FOR A DUAL-FLOW TURBINE ENGINE

(71) Applicant: SAFRAN AIRCRAFT ENGINES, Paris (FR)

(72) Inventors: Raphaël Jean-Louis Coste, Moissy-Cramayel (FR); Mohammed Meqqadmi, Moissy-Cramayel (FR); Armand Dariouche Alimardani, Moissy-Cramayel (FR); Alexis Louis-Marie Maire, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1077 days.

(21) Appl. No.: 17/617,674

(22) PCT Filed: May 5, 2020

(86) PCT No.: PCT/FR2020/050746
§ 371 (c)(1),
(2) Date: Dec. 9, 2021

(87) PCT Pub. No.: WO2020/249878
PCT Pub. Date: Dec. 17, 2020

(65) Prior Publication Data
US 2022/0236701 A1    Jul. 28, 2022

(30) Foreign Application Priority Data
Jun. 10, 2019 (FR) ..................................... 19 06149

(51) Int. Cl.
*F02C 9/28* (2006.01)
*F02C 9/18* (2006.01)
(Continued)

(52) U.S. Cl.
CPC ................ *F02C 9/28* (2013.01); *F02C 9/18* (2013.01); *F02C 9/48* (2013.01); *G05B 13/048* (2013.01)

(58) Field of Classification Search
CPC ..... F02C 9/28; F02C 9/18; F02C 9/48; G05B 13/048
See application file for complete search history.

(56) References Cited

U.S. PATENT DOCUMENTS

| 2003/0074171 | A1  | 4/2003 | Desai et al. |
| 2010/0223903 | A1* | 9/2010 | Starr ...................... F02C 9/18 60/226.1 |

(Continued)

FOREIGN PATENT DOCUMENTS

| DE | 10 2015 119 363 A1 | 5/2016 |
| EP | 1 298 512 A2 | 4/2003 |
| EP | 2 570 616 A2 | 3/2013 |

OTHER PUBLICATIONS

Dengji Zhou et al.; "A New Gas Path Fault Diagnostic Method of Gas Turbine Based on Support Vector Machine"; Journal of Engineering for Gas Turbines and Power; Oct. 2015, vol. 137 (Year: 2015).*

(Continued)

*Primary Examiner* — Rehana Perveen
*Assistant Examiner* — Nupur Debnath
(74) *Attorney, Agent, or Firm* — Oblon, McClelland, Maier & Neustadt, L.L.P.

(57) ABSTRACT

A method for determining a predictive model of a pressure ratio P1/P2 for a bypass turbomachine of previously defined type including primary and secondary air paths separated by an inter-path compartment, the P1 pressure corresponding to an air pressure inside the inter-path compartment, the P2 pressure corresponding to an air pressure in the secondary air path. The method includes acquiring, on a test turboma- (Continued)

chine in operation, at respective measurement times, sets of measurements each including a P1 measurement, a P2 measurement, a measurement M of a Mach number of the test turbomachine, and a PCN12R measurement representing a low pressure rating, obtaining the sets of measurements by a processing device, supervised learning, by the processing device and on the basis of the sets of measurements obtained, of a predictive model of the ratio P1/P2 as a function of the M number and of the PCN12R rating considered as explanatory variables.

5 Claims, 4 Drawing Sheets

(51) Int. Cl.
*F02C 9/48* (2006.01)
*G05B 13/04* (2006.01)

(56) References Cited

U.S. PATENT DOCUMENTS

| | | |
|---|---|---|
| 2013/0073170 A1 | 3/2013 | Drohan et al. |
| 2013/0145769 A1* | 6/2013 | Norris ................. F02C 7/32 60/722 |
| 2016/0108807 A1* | 4/2016 | Schwarz ............... F01D 5/02 475/331 |
| 2016/0146134 A1 | 5/2016 | Wang et al. |
| 2017/0370285 A1* | 12/2017 | Suciu ................. F02C 9/16 |
| 2018/0252166 A1* | 9/2018 | Pointon ............... F16H 1/28 |

OTHER PUBLICATIONS

S.-M. Lee et al.; "A study on separate learning algorithm using support vector machine for defect diagnostics of gas turbine engine"; Journal of Mechanical Science and Technology 22 (2008) 2489~2497 (Year: 2008).*

Y. Kim et al.; "Multiple defect diagnostics of gas turbine engine using SVM and RCGA-based ANN algorithms"; Journal of Mechanical Science and Technology 26 (5) (2012) 1623~1632 (Year: 2012).*

Xiang Xin et al.; "High Bypass Ratio Turbofan Engine with Additional Tip Driving Fan: a Design Innovation"; AIAA Propulsion and Energy Forum Jul. 27-29, 2015 (Year: 2015).*

International Search Report issued on Jul. 13, 2020 in PCT/FR2020/050746 filed May 5, 2020, 2 pages.

Preliminary French Search Report issued on Feb. 25, 2020 in French Patent Application No. 1906149 filed Jun. 10, 2019, 3 pages (with Translation of Category).

* cited by examiner

METHOD FOR DETERMINING A PREDICTIVE MODEL OF A PRESSURE RATIO FOR A DUAL-FLOW TURBINE ENGINE

PRIOR ART

This invention belongs to the general field of turbomachines, i.e. gas turbine engines, more particularly bypass turbomachines intended for propelling aircraft. It relates to a method for determining a predictive model of a pressure ratio for a bypass turbomachine. The invention also relates to a method for determining a table of pressure ratios for commanding a valve for controlling sets of blades of a low pressure turbine equipping a bypass turbomachine.

Bypass turbomachines appeared in the 1960s, and have since been much developed, in particular for subsonic speed envelopes. They specifically have the advantage of reducing the consumption of fuel required for their operation. They are also less noisy.

FIG. 1 schematically represents an exemplary embodiment of a bypass turbomachine 100 intended to equip an aircraft, as known in the prior art. FIG. 1 more specifically corresponds to a longitudinal section view of the turbomachine 100.

The term "longitudinal" here refers to a direction along an axis of flow of the air flow within said turbomachine 100. For the remainder of the description, the term "radial", meanwhile, refers to a direction normal to the longitudinal axis of flow of the air flows.

Conventionally, and as illustrated in FIG. 1, the bypass turbomachine 100 includes a shrouded fan 101, also known as a fan, the latter being generally placed upstream of the engine along the direction of flow of the air flow within said engine. The mass of air taken in by means of said fan 101 is divided into a primary flow FP and a secondary flow FS, the two flows being concentric. The primary flow FP exits the fan in a primary air path VP where it is typically compressed by a first compressor 102, the so-called low pressure or booster compressor, then in a second compressor 103, the so-called high pressure compressor, before entering a combustion chamber 104, to finally feed a high pressure turbine 105 and a low pressure turbine 106 in succession. The secondary flow FS is meanwhile compressed by the shrouded fan stage 101 after passing through guide vanes of OGV (Outlet Guide Vane) type 109, then directly expelled, without having been heated, into the atmosphere to supply the majority of the thrust of the turbomachine 100.

The separation of the mass of intake air into two flows FP, FS is done downstream of the fan, at the level of an inter-path compartment 110 (also known as a "core compartment") which envelops the primary flow FP and which guides, via its outer part (i.e. its part not in contact with the primary flow FP), the secondary flow FS along a secondary flow path VS.

Moreover, and as represented in FIG. 1, the low pressure turbine 106 includes a plurality of vanes 107 extending radially, and is housed inside a casing 108. In a known manner, the controlling of the set of blades of the low pressure turbine 106, i.e. the controlling of the distance between the respective tips of these blades 107 and the casing 108, is a key point of interest from the point of view of improvement of the specific consumption, i.e. the quantity of fuel needed to produce a thrust of one Newton for one hour. It is particularly crucial to be able to finely control these sets of blades during flight phases corresponding to high engine ratings and to a high Mach number (climb and so-called "cruise" phases).

This is because, during such phases, the turbomachine 100 is exposed to high mechanical and thermal stresses, causing the expansion of certain components able to modify the clearance of the blades, which can cause the deterioration of the specific consumption.

In order to control the sets of blades between the low pressure turbine 106 and the casing 108 surrounding it, it is known to make use of a control valve of LPTACC (Low Pressure Turbine Active Clearance Control) type, as detailed, for example, in the document FR 3 059 042.

FIG. 2 schematically represents the architecture of the environment of a control valve 200 of LTPACC type and of its active control. This control valve 200 makes it possible to continuously control a flow rate of air coming from the secondary air path VS, starting from a tapping 210, and to direct it toward the casing 108 disposed facing the blades 107 of the low pressure turbine 106. Such a tapping is for example embodied downstream of the OGVs 109 by means of an opening forming a gate, in the manner of a scoop. The tapping 210 communicates with a delivery duct 220 which conveys the air flow to the control valve 200. An exhaust duct 240 then conveys this air from the control valve 200 toward the casing 108.

As also illustrated by FIG. 2, a computing unit 400, also known by the name of FADEC (Full Authority Digital Engine Control) particularly receives as input a value of the engine rating as well as a Mach number associated with the aircraft in operation (and therefore in fine with the turbomachine 100 in operation). Based on these input data, the computing unit 400 determines a command of the flow rate of the control valve 200. This flow rate command is conventionally converted into a position command sent to an actuator 300 which drives the valve 200, via the tapping 210 in the secondary air path VS. Provision is made for a feedback link between the control valve 200 and the computing unit 400.

One of the aims of the control is therefore to define an optimal air flow rate of the valve making it possible to limit as much as possible the clearance at the blade 107 tips, so as to optimize the energy efficiency of the low pressure turbine 106, particularly around the climb and cruise phases (for example around the cruise 7 point at an altitude substantially equal to 13716 meters, or substantially equal to 45 kft, "kft" here referring to an altitude measured in feet). It should also be noted that the commanding of the control valve 200 makes it possible to ensure the thermal resistance of the casing 108. Specifically, it is important to guarantee that the temperature of the latter is kept within a recommended range, for example a temperature less than 690° C. when the control valve is operating correctly, or else less than 750° C. in the event of a malfunction thereof.

As mentioned above, the commanding of the control valve 200 is performed in flight by the computing unit 400 based on a value of the engine rating as well as a Mach number of the turbomachine 100.

More precisely, this value of the engine rating, which will henceforth be denoted by the acronym "PCN12R" in the remainder of the description, is equivalent to a so-called "low pressure" rating, i.e. a rating of the rotation speed of the low pressure turbine 106. More precisely, the PCN12R value essentially results from the expression of the rotation speed of the low pressure turbine 106 (or equivalently, of the rotation speed of the fan 101) as a percentage of a given nominal rating. Said nominal rating is set, in a manner known per se, in the pre-project phase of the development of the turbojet. It will therefore be understood that the PCN12R value is equivalent to a dimensionless quantity, obtained by comparison with said nominal rating. It should be noted that this quantity can where applicable be modulated by a coefficient taking account of an ambient temperature.

Thus, based on the values of PCN12R and Mach number obtained during flight, the computing unit 400 essentially determines a P1 pressure, via an intermediate computation of a pressure ratio P1/P2. The P1 pressure corresponds to an air pressure within the inter-path compartment 110, this P1 pressure being necessary to command the control valve 200. The P2 pressure, meanwhile, corresponds to an air pressure in the secondary air path VS, for example between the OGVs 109 and a radial plane located at the level of the upstream part of the high pressure compressor 103.

To determine the ratio P1/P2 from the values of PCN12R and Mach number obtained during flight, at least one table is conventionally implemented in the computing unit 400. Such a table corresponds to a two-dimensional grid including nodes respectively associated with a Mach number M of the turbomachine 100, as well as with a PCN12R value. With each node of the grid is associated a value of the ratio P1/P2 obtained by applying a predictive model. This is a predictive model of the ratio P1/P2 as a function of the Mach number and the PCN12R rating considered as explanatory variables, and determined on the basis of the P1, P2, M and PCN12R data acquired during one or more test campaigns. Put differently again, this predictive model can be represented by a function F such that P1/P2=F(M, PCN12R).

The table thus filled in is implemented in the control unit 400. Due to constraints on software development, but also the storage capacity of the computing unit 400, this table is of a given size. For example, it contains as input six Mach values (for example 0, 0.3, 0.6, 0.75, 0.8, 1) along with ten PCN12R values (for example from 20% to 100% in increments of 10%, and 105%), so as to contain sixty ratio values P1/P2.

Once the table has been implemented in the control unit 400, the ratios P1/P2 contained in the table are interpolated by the unit 400 to estimate P1/P2 values not contained in the table (due to its limited size). The table therefore serves as support to the computing unit 400 for estimating the ratio P1/P2 at any operating point of the turbomachine 100. In addition, once a ratio P1/P2 has been determined by the computing unit 400 by interpolation, this can easily escalate the value of P1, essential for commanding the control valve 200, the P2 pressure being specifically a parameter, the prediction of which is under control.

Although this way of proceeding makes it possible to estimate pressure values P1 for commanding the control valve, it remains highly deficient at the present time.

This is because the predictive model used to construct a table of P1/P2 ratios proves highly inaccurate. This inaccuracy fundamentally stems from the way in which this predictive model is constructed, namely that said data acquired during test campaigns are initially classified into tranches of Mach values M. Several interpolations (polynomial, linear) are then executed for each of its tranches, so as to obtain one predictive model per Mach tranche. It has been observed that some of these models are problematic insofar as they generate a plurality of ratios P1/P2, for one and the same pair of M and PCN12R values. In other words, to fill a node of a table corresponding to a given pair of M and PCN12R values, it may be necessary to make a choice between several P1/P2 ratios generated for this node. This choice is a source of inaccuracy, since P1/P2 values are excluded when they could turn out to be more relevant.

The inaccuracy generated by such a predictive model propagates through the table intended to be implemented in the computing unit 400. It will furthermore be understood that this inaccuracy then propagates to the values determined by the computing unit 400 by interpolation in the table, then finally to the command of the control valve 200. This results in an air flow rate of the valve that is potentially unsuitable for controlling the blade set.

SUMMARY OF THE INVENTION

This invention has the aim of remedying all or part of the drawbacks of the prior art, particularly those set out above, by making provision for a solution that makes it possible to obtain a predictive model of a pressure ratio P1/P2 for a bypass turbomachine that is more accurate than the solutions of the prior art, so as to be able to limit very effectively the inaccuracy of the values contained in a table determined by means of such a predictive model.

For this purpose, and according to a first aspect, the invention relates to a method for determining a predictive model of a pressure ratio P1/P2 for a bypass turbomachine of previously defined type including a primary air path and a secondary air path separated by an inter-path compartment, the P1 pressure corresponding to an air pressure inside said inter-path compartment, the P2 pressure corresponding to an air pressure in the secondary air path. Furthermore, said method is implemented by a processing system including acquiring means as well as a processing device, and comprises:

a step of acquiring, by said acquiring means and on a test turbomachine in operation corresponding to the previously defined type, at respective measurement times, sets of measurements each including a P1 measurement, a P2 measurement, a measurement M of a Mach number of the test turbomachine, and a PCN12R measurement representing a low pressure rating of the test turbomachine, a step of obtaining said sets of measurements by the processing device, a step of supervised learning, by the processing device and on the basis of said sets of measurements obtained, of a predictive model of the ratio P1/P2 as a function of the M number and of the PCN12R rating considered as explanatory variables.

The fact of implementing supervised learning to determine the predictive model of the ratio P1/P2 advantageously makes it possible to avoid any subdividing of the sets of measurements acquired by Mach M tranche, as done in the prior art. In other words, by proceeding via supervised learning, the prejudice according to which the pressure ratio P1/P2 must be predicted using predictive models respectively associated with Mach M tranches is overcome.

Moreover, the inventors found that the implementation of supervised learning had the noteworthy effect of greatly improving the accuracy of the predictive model obtained. This increased accuracy fundamentally stems from the fact that it is no longer necessary to make arbitrary choices of ratio P1/P2 for one and the same pair of explanatory values (M, PCN12R), as detailed above with reference to the prior art.

In particular modes of implementation, the method for determining a predictive model may further include one or more of the following features, taken in isolation or in any of their technically possible combinations.

In particular modes of implementation, the step of supervised learning includes the implementation of a machine algorithm with support vectors.

Such an algorithm for the supervised learning makes it possible to obtain excellent accuracy results for the prediction model, as the inventors have found. Advantageously, such an algorithm also offers the possibility to take into consideration other explanatory variables such as the M number and PCN12R rating alone. Although this is not yet made use of due to the limited size of the tables implemented in the computing units (FADEC) of aircraft, it will nonetheless be understood that future variations in this constraint will make it possible to further improve the accuracy of the predictive model owing to the invention.

In particular modes of implementation, the support vector machine algorithm uses a Gaussian kernel.

The use of such a Gaussian kernel particularly makes it possible to limit the computing cost of the supervised learning step, and is based for this purpose on a so-called "kernel trick" technique known to those skilled in the art.

In particular modes of implementation, said method includes, between the obtaining step and the supervised learning step, a step of filtering the sets of measurements obtained, so as to delete sets each including at least one measurement located outside a previously-defined interval associated with said measurement.

The fact of performing such a filtering advantageously makes it possible to dispense with sets of measurements containing outlier measurements. Thus, the sets used during the supervised learning step are filtered, and the accuracy of the predictive model obtained is further increased.

In particular modes of implementation, said method includes a step of validating the predictive model learnt, such that if said model is not validated, at least the supervised learning step is reiterated.

Such a validation makes it possible to increase the robustness of the method for determining the predictive model. It is therefore a question of checking that this predictive model has a behavior in accordance with an expected behavior to predict the ratio P1/P2 as a function of the M and PCN12R variables.

In particular modes of implementation, the validating step includes a crossed validation of "k-fold" type.

According to a second aspect, the invention relates to a method for determining at least one table of pressure ratios P1/P2 intended to command a valve for controlling sets of blades of a low pressure turbine equipping a bypass turbomachine, said turbomachine including a primary air path and a secondary air path separated by an inter-path compartment, the P1 pressure corresponding to an air pressure inside said inter-path compartment, the P2 pressure corresponding to an air pressure in the secondary air path. Furthermore, said method includes:

a step of obtaining a predictive model of a pressure ratio P1/P2 previously determined for said turbomachine according to the invention, a step of generating at least one empty two-dimensional grid of predetermined size, one dimension of which corresponds to values of Mach number M of the turbomachine, and the other dimension of which corresponds to PCN12R values representing a low pressure rating of the turbomachine, a step of filling in the grid, each node of the grid being associated with a pressure ratio P1/P2 determined by applying said predictive model to the M and PCN12R values associated with said node, the grid thus filled in forming a table of pressure ratios P1/P2.

The fact of using the predictive model determined according to the invention is particularly advantageous here insofar as the table directly benefits from the computing accuracy of the model. In other words, the table determined here includes much more accurate ratios P1/P2 than those obtained with the models by tranche of the prior art, and this is the case whatever the M and PCN12R values supplied as input to the grid.

Moreover, said table is intended to be used by a computing unit of an aircraft to determine, by bilinear interpolation, P1/P2 pressure ratios not initially contained in the table. Consequently, it will be understood that the accuracy gain of the table determined according to the invention propagates to the values determined by the computing unit.

In particular modes of implementation, the method for determining at least one table can further include one or more of the following features, taken in isolation or in any technically possible combination.

In particular modes of implementation, a plurality of empty two-dimensional grids of identical respective sizes is generated at random during the step of generating at least one grid, so as to obtain a plurality of tables of pressure ratios P1/P2, so-called "model tables", corresponding respectively to said grids filled in during the filling-in step, said method further including:

a step of generating pairs, so-called "test pairs", each test pair being formed by a value of Mach number M as well as a PCN12R value, a step of determining, for each model table and for each test pair, a pressure ratio P1/P2, the so-called "test ratio", by bilinear interpolation between P1/P2 pressure ratios contained in said model table, a step of determining pressure ratios P1/P2, so-called "predicted ratios", by applying said predictive model to each test pair, a step of estimating, for each model table, at least one interpolation error as a function of differences between the predicted ratios associated with said model table and the test ratios, each difference being evaluated for a predicted ratio and a test ratio associated with one and the same test pair, a step of determining, where applicable, from among the model tables, at least one table, the so-called "optimal table", the interpolation error of an optimal table being less, as an absolute value, than a predefined threshold value.

Such an implementation for the determination, where applicable, of at least one optimal table is therefore particularly advantageous in that it offers the possibility of obtaining optimal tables that may occur which differ from one another (this is due to the randomly generated grids). This results in the possibility of obtaining optimal tables that have fine meshes for flight phases during which it is crucial to accurately evaluate the P1 pressures (high Mach number M and/or high PCN12R rating), so that the computing unit 400 accurately commands the control valve.

In particular modes of implementation, two interpolation errors are estimated for each model table:
  a first interpolation error corresponding to the maximum, as an absolute value, of the differences between the predicted ratios and the test ratios, for test ratios for which the test pairs associated have a PCN12R value between 91% and 95% along with a value of Mach number M between 0.79 and 0.89, the threshold value associated with said first interpolation error being equal to 0.5%;
  a second interpolation error corresponding to the maximum, as an absolute value, of the differences between the predicted ratios and the test ratios, for the test ratios for which the associated test pairs have a PCN12R value less than 91% along with a value of Mach number M less than 0.79, the threshold value associated with said second interpolation error being equal to 1.5%.

In particular modes of implementation, the number of test pairs generated is ten times greater than the number of two-dimensional grids generated at random.

According to a third aspect, the invention relates to a computer program including a set of program code instructions which, when they are executed by a processor, configure said processor for implementing:
- steps of obtaining and supervised learning of a method for determining a predictive model according to the invention, and/or
- a method for determining at least one table according to the invention.

According to a fourth aspect, the invention relates to a recording medium readable by a computer on which is recorded a computer program according to the invention.

According to a fifth aspect, the invention relates to a processing device for determining a predictive model of a pressure ratio P1/P2 for a bypass turbomachine of previously defined type including a primary air path and a secondary air path separated by an inter-path compartment, the P1 pressure corresponding to an air pressure inside said inter-path compartment, the P2 pressure corresponding to an air pressure in the secondary air path.

Furthermore, said device comprises:
- an obtaining module, configured to obtain sets of measurements previously acquired at respective measurement times on a test turbomachine in operation corresponding to the predefined type, each set of measurements including a P1 measurement, a P2 measurement, a measurement M of a Mach number of the test turbomachine, and a PCN12R measurement representing a low pressure rating of the test turbomachine,
- a supervised learning module, configured to learn in a supervised manner, on the basis of said sets of measurement obtained, a predictive model of the ratio P1/P2 as a function of the M number and of the PCN12R rating considered as explanatory variables.

According to a sixth aspect, the invention relates to a processing system for determining a predictive model of a pressure ratio P1/P2 for a bypass turbomachine of previously defined type including a primary air path and a secondary air path separated by an inter-path compartment, the P1 pressure corresponding to an air pressure inside said inter-path compartment, the P2 pressure corresponding to an air pressure in the secondary air path.

Furthermore, said system comprises:
- acquiring means configured to acquire on a test turbomachine in operation corresponding to the previously defined type, at respective measurement times, sets of measurements each including a P1 measurement, a P2 measurement, a measurement M of a Mach number of the test turbomachine and a PCN12R measurement representing a low pressure rating of the test turbomachine,
- a processing device for determining a predictive model according to the invention.

According to a seventh aspect, the invention relates to a processing device for determining at least one table of pressure ratios P1/P2 intended for commanding a control valve of a set of blades of a low pressure turbine equipping a bypass turbomachine, said turbomachine including a primary air path and a secondary air path separated by an inter-path compartment, the P1 pressure corresponding to an air pressure inside said inter-path compartment, the P2 pressure corresponding to an air pressure in the secondary air path. Furthermore, said processing device includes:
- an obtaining module, configured to obtain a predictive model of a pressure ratio P1/P2 previously determined for said turbomachine according to the invention,
- a generating module, configured to generate at least one empty two-dimensional grid of predetermined size, one dimension of which corresponds to values of Mach number M of the turbomachine, and the other dimension of which corresponds to PCN12R values representing a low pressure rating of the turbomachine,
- a filling-in module, configured to fill in the grid, each node of the grid being associated with a pressure ratio P1/P2 determined by applying said predictive model to the Mach number M and to the PCN12R value associated with said node, the grid thus filled in forming a table of pressure ratios P1/P2.

According to an eighth aspect, the invention relates to a method for commanding a valve for controlling sets of blades of a low pressure turbine equipping a bypass turbomachine, said method being implemented by a computing unit including a table determined according to the invention.

According to a ninth aspect, the invention relates to a computing unit for commanding a valve for controlling sets of blades of a low pressure turbine equipping a bypass turbomachine, said computing unit including a table determined according to the invention.

According to a tenth aspect, the invention relates to an aircraft including:
- a bypass turbomachine,
- a valve for controlling sets of blades of a low pressure turbine equipping said turbomachine,
- a computing unit according to the invention.

BRIEF DESCRIPTION OF THE DRAWINGS

Other features and advantages of this invention will become apparent from the description below, with reference to the appended drawings which illustrate an exemplary embodiment thereof devoid of any limitation. In the figures.

DESCRIPTION OF THE EMBODIMENTS

This invention has a place in the field of the commanding of a valve of LPTACC type equipping a bypass turbomachine.

Figure 3:
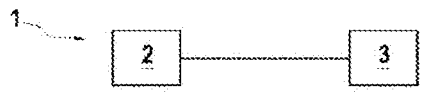
FIG. 3 schematically represents an exemplary embodiment, according to the invention, of a processing system configured to determine a predictive model of a pressure ratio P1/P2 for a bypass turbomachine of a previously defined type.

FIG. 3 schematically represents an exemplary embodiment, according to the invention, of a processing system 1 configured to determine a predictive model of a pressure ratio P1/P2 for a bypass turbomachine of previously defined type.

The term "bypass turbomachine of previously defined type" here refers to a bypass turbomachine developed according to a given technical specifications book, for example a technical specifications book designed by an engine builder, for the purpose of series production for equipping aircraft.

Figure 1:
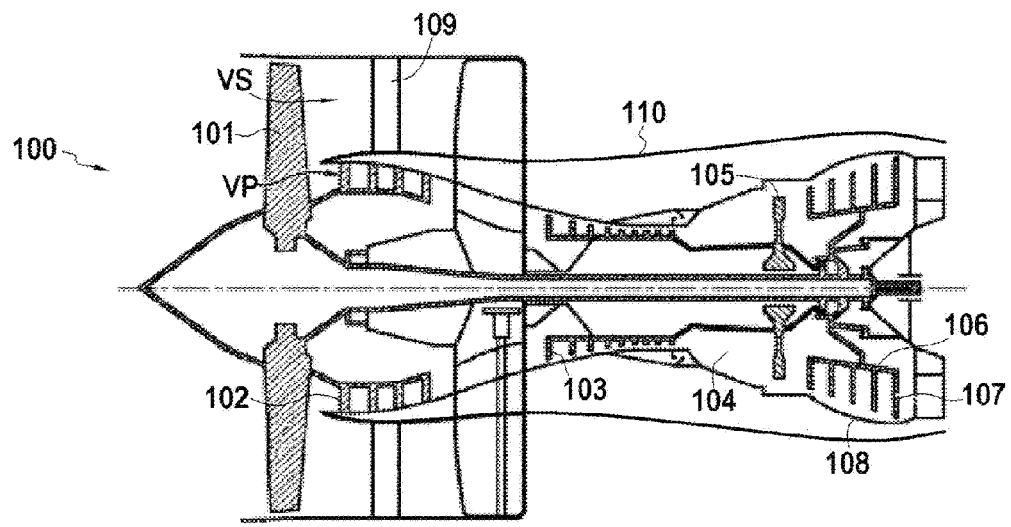
FIG. 1 schematically represents an exemplary embodiment of a bypass turbomachine intended to equip an aircraft, as known in the prior art.

For the remainder of the description, it is considered that the turbomachine to which reference is made for the invention allows for a general configuration in accordance with the prior art. By way of example, without any limitation, such a general configuration has been described above with reference to FIG. 1, the numbers of which are repeated here. At the very least, it is here briefly recalled that the bypass turbomachine 100 includes a primary air path VP and a secondary air path VS separated by an inter-path compartment 110, the P1 pressure corresponding to an air pressure inside said inter-path compartment 110. Note that the P1 pressure is the same at all points of the inter-path compartment 110.

The P2 pressure, meanwhile, corresponds to an air pressure in the secondary air path VS.

Furthermore, the remainder of the description more specifically relates to aircraft of civil airplane type able to transport passengers. However, no limitation is attached to the type of aircraft able to be considered for the invention, as long as the propulsion of this aircraft is implemented by at least one bypass turbomachine 100.

The processing system 1 includes acquiring means 2 configured to acquire sets of measurements on a test turbomachine 100 corresponding to the previously defined type.

The term "test turbomachine" here refers, preferably, to a turbomachine 100 mounted on a test bench, and compliant with the type intended to be series produced. Nothing however precludes the consideration of other test configurations for the bypass turbomachine 100, such as for example a turbomachine equipping an aircraft used for test purposes for the invention.

It should be noted that the fact of acquiring the sets of measurements on a test turbomachine makes it possible to form a bank of data then used to determine said predictive model, as will be detailed below.

Said sets of measurements are acquired at respective measurement times, and each include a P1 measurement, a P2 measurement, a measurement M of a Mach number of the test turbomachine 100 and a PCN12R measurement representing a low pressure rating of the test turbomachine 100. It will therefore be understood that each set of measurements corresponds to a quadruplet of type (P1, P2, M, PCN12R).

Conventionally, the acquiring means 2 include at least one sensor dedicated to the measurement of each quantity P1, P2, M, PCN12R. Such sensors are integrated into the engine, and are of a type known per se. For example, to obtain P2 pressure measurements, sensors equipped with combs mounted at different radial positions are positioned in the secondary air path VS downstream of the OGVs 109. To obtain P1 pressure measurements, sensors can be positioned indifferently in the inter-path compartment 110. Measurements of the Mach number and the PCN12R rating are for example obtained respectively by means of a Pitot tube and a magnetic tachometer.

In general, those skilled in the art know how to perform the acquisition of said sets of measurements, and will therefore know how to choose appropriate sensors for each of the quantities under consideration, for example from the catalogs of products offered by specialist manufacturers. Those skilled in the art will also know how to position these sensors.

The processing system 1 also includes a processing device 3 configured, particularly, to obtain the measurement sets that have been acquired. For this purpose, the processing device 3 includes an obtaining module (not represented in the figures) equipped for example with communicating means for receiving said sets, after these latters have been transmitted by the acquiring means 2, themselves provided in this case with communicating means suitable for transmission. These communicating means rely, in a manner known per se, on a communication interface able to exchange data between the acquiring means 2 and said device 3. No limitation is attached to the nature of this communication interface, which can be wired or wireless, so as to allow the exchange of data according to any protocol known to those skilled in the art (Ethernet, WiFi, Bluetooth, 3G, 4G, 5G, etc.).

Nor does anything preclude the processing device 3 from obtaining, via its obtaining module, the sets of measurements after these latters have been acquired and stored in storage means external to the processing device 3, such as for example a dedicated database.

In general, no limitation is attached to the way in which the sets of measurements are obtained by the processing device 3.

The processing device 3 is also configured to perform, for the type of turbomachine 100 under consideration and on the basis of the sets of measurements obtained, processing with the aim of determining said predictive model, by implementing a part of the steps of a method for determining said model.

For this purpose, the processing device 3 for example includes one or more processors and memory storage means (magnetic hard disk, electronic memory, optical disk etc.) in which data and a computer program are stored, in the form of a set of program code instructions to be executed to implement a part of the steps of the method for determining the predictive model.

Alternatively or additionally, the processing device 3 also includes one or more programmable logic circuits, of FPGA, PLD type etc., and/or specialized integrated circuits (ASIC), and/or a set of discrete electronic components etc. able to implement a part of the steps of the method for determining the predictive model.

In other words, the processing device 3 includes a set of means configured in software (specific computer program) and/or hardware (FPGA, PLD, ASIC, etc.) to implement a part of the steps of the method for determining the predictive model.

It should be noted that, in this exemplary embodiment, the processing device 3 is positioned remotely from the test turbomachine 100. However, nothing precludes the consideration of a processing device 3 equipping said test turbomachine 100.

Figure 4:
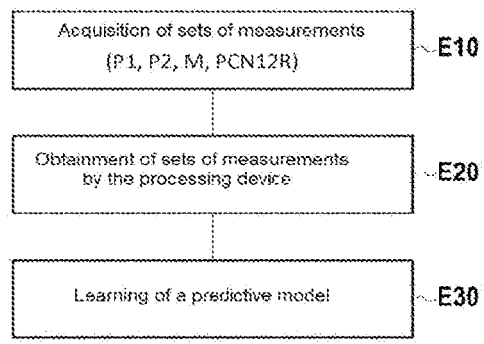
FIG. 4 represents a flow chart of a mode of implementation, according to the invention, of a method for determining a predictive model.

FIG. 4 represents a flow chart of a mode of implementation, according to the invention, of the method for determining the predictive model.

As illustrated in FIG. 4, the method for determining the predictive model first includes a step E10 of acquiring sets of measurements on the test turbomachine 100.

For example, said acquiring step E10 is executed during a predetermined time period, the measurement times respectively associated with the sets of measurements being separated from one another by a predetermined increment, so as to acquire a sufficient volume of sets of measurements, typically several thousands of sets of measurements, for example 2000 sets of measurements. The invention nonetheless remains applicable to any number of sets of measurements, and it is of course understood that the accuracy of the predictive model determined during the method is correlated with the number of sets of measurements acquired.

Said predetermined time period for example corresponds to the total duration of a use session of the test turbomachine 100.

According to another example, the acquisition of the measurements is triggered during one or more specific phases of operation of the test turbomachine 100, the predetermined time period being hence adjusted to correspond to the respective durations of these specific phases.

Once said sets of measurements are acquired, said method includes a step E20 of obtaining said sets of measurements by the processing device 3, via the obtaining module of this latter.

Once the sets of measurements are obtained by the processing device 3, said method includes a step E30 of supervised learning, by said device 3 and on the basis of said sets of measurements, of a predictive model of the ratio P1/P2 as a function of the M number and of the PCN12R rating considered as explanatory variables.

Thus, the determined predictive model corresponds to a function F such that P1/P2=F(M, PCN12R). Put still otherwise, determining F equates to performing a regression of the variable P1/P2 explained as a function of the explanatory variables M and PCN12R. According to the invention, this function F is obtained by supervised learning.

The fact of implementing supervised learning to determine the predictive model of the ratio P1/P2 advantageously makes it possible to avoid any subdividing of the sets of measurements acquired by Mach M tranche, as practiced in the prior art. Furthermore, this implementation makes it possible to greatly improve the accuracy of the predictive model obtained.

It should be noted that the evaluation of the difference in accuracy between a predictive model according to the invention and the predictive models by Mach tranche obtained in the prior art can be implemented using any statistical test known to those skilled in the art. For example, this statistical test can be an exact Fisher test executed using the free software R, in order to compare the residual variance of the predictive model according to the invention with the predictive models of the prior art.

In a preferred mode of implementation, the supervised learning step E30 includes the implementing of a support vector machine algorithm. Such an algorithm is still known by the name "SVM" (Support Vector Machine), and makes it possible to apply linear regression methods to explained variables, the variation of which is in theory non-linear, which is the case of the explained variable P1/P2.

For example, the support vector machine algorithm uses a Gaussian kernel. The use of such a kernel particularly makes it possible to limit the computing cost of the supervised learning step, and for this purpose relies on a "kernel trick". This way of proceeding being known to those skilled in the art, it will not be addressed more detail here.

It should however be noted that the choice of a Gaussian kernel constitutes only one variant of implementation of the invention. Other kernels may be envisioned, such as for example a polynomial kernel.

The fact of using a support vector machine algorithm, particularly when the latter uses a Gaussian kernel, makes it possible to obtain excellent accuracy results for the predictive model, by comparison with the predictive models of the prior art.

It should however be noted that no limitation is attached to the implementation of the supervised learning step E30. Thus, other algorithms may be envisioned, such as for example an algorithm of decision tree forests (random forest classifiers).

Furthermore, and in a manner perfectly clear to those skilled in the art, it will be understood that the accuracy of the predictive model obtained by supervised learning particularly depends on the number of sets of measurements under consideration. No limitation is in itself attached to this number, since the supervised learning method in itself cancels the unfavorable bias of the prior art (one predictive model for each Mach M tranche).

Figure 5:
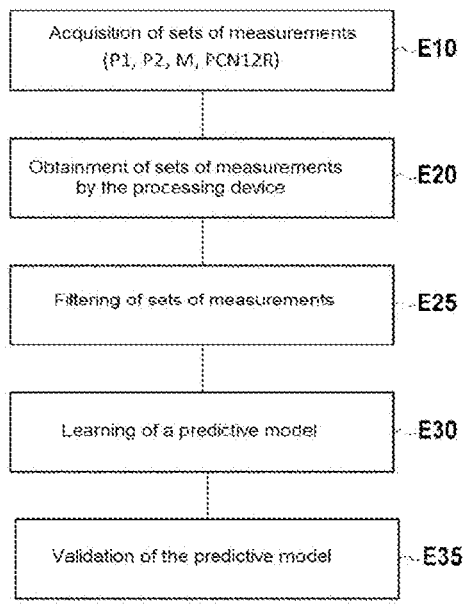
FIG. 5 schematically represents a preferred mode of implementation of the method of FIG. 4.

FIG. 5 schematically represents a preferred mode of implementation of the method of FIG. 4.

As illustrated in FIG. 5, the method for determining the predictive model includes, before the supervised learning step E30, a step E25 of filtering the sets of measurements obtained, so as to delete the sets each including at least one measurement located outside a previously-defined interval associated with said measurement.

According to this preferred mode, the filtering step E25 is implemented by the processing device 3, and advantageously makes it possible to dispense with the sets of measurements containing outlier measurements. Thus, the sets used in the supervised learning step E30 are filtered, and the accuracy of the predictive model obtained is further increased.

By way of purely limiting example, an outlier measurement can correspond to a zero Mach speed M even while the test turbomachine 100 is in operation under conditions aiming to replicate a cruise phase. In this example, the set including such a measurement M is therefore not chosen.

It is moreover noted that the filtering step E25 can include, before the filtering in the strict sense according to said intervals, the sorting of the sets of measurements as a function of the specific phases during which said sets were acquired. In this way, the intervals used during filtering can be differentiated as a function of the specific phase under consideration. This results in a more relevant filtering of the sets of measurements.

Moreover, and as illustrated in FIG. 5, the method also includes, in this preferred mode of implementation, a step E35 of validating the predictive model learned, so that if said model is not validated, at least the supervised learning step E30 is reiterated.

Proceeding in this way makes it possible to increase the robustness of the method for determining the predictive model. It is therefore a question of verifying that this predictive model has a behavior compliant with an expected behavior to predict the ratio P1/P2 as a function of the variables M and PCN12R.

It should be noted that if the predictive model is not validated, the supervised learning step E30 is for example implemented on the basis of the sets of measurements already acquired beforehand, preferably by modifying certain parameters specific to the execution of the chosen learning method.

Alternatively, if the predictive model is not validated, all the steps of the determining method are executed again. In other words, a new campaign of tests is carried out, so as to obtain new sets of measurements from which a predictive model is learned.

Preferably, the validating step E35 includes a cross-validation of "k-fold" type. Such a cross-validation consists first in dividing the acquired sets of measurements into k samples. The predictive model learned is then trained on k−1 samples (therefore k−1 sets of measurements), to finally be validated on the remaining k-th sample. One thus obtains a score, the so-called "performance score", for example representing the quadratic error of the predictive model learned. This process is repeated, varying the k-th validation sample, so as to obtain in the end k performance scores. The computing of an average of these k performance scores supplies an indicator of the validity of the predictive model obtained during the supervised learning step E30.

The choice of a cross-validation of "k-fold" type constitutes only one variant of implementation of the invention. Any method of validation known to those skilled in the art can be envisioned, such as for example a cross-validation method of "holdout method" type, or else a cross-validation method of LOOCV (Leave-One-Out Cross-Validation) type.

Although the filtering E25 and validating E35 steps have been described, with reference to FIG. 5, as being both executed within one and the same mode of implementation, it should however be noted that the execution of only one of these two steps E25, E35 may be envisioned for the invention.

The invention has until now been described in the context of the determination of a predictive model of the ratio P1/P2 for a bypass turbomachine 100. When such a predictive model has been determined, it can be used, according to another aspect of the invention, by the device 3 for carrying out processing with the aim of determining at least one table of pressure ratios P1/P2 intended to be implemented in a computing unit of an aircraft, by implementing a method for determining said at least one table.

As detailed previously, said at least one table is intended to command a valve for controlling the blade sets of a low pressure turbine 106 equipping the bypass turbomachine 100, more particularly a valve of LPTACC type.

It should be noted that said method for determining at least one table is here implemented by the processing device 3 having already performed the determination of the predictive model. However, nothing precludes these two methods from being implemented by separate processing devices. In this case, the processing device used for determining at least one table allows for a software and/or hardware configuration identical to that of the processing device 3 used for determining the predictive model.

Figure 2:
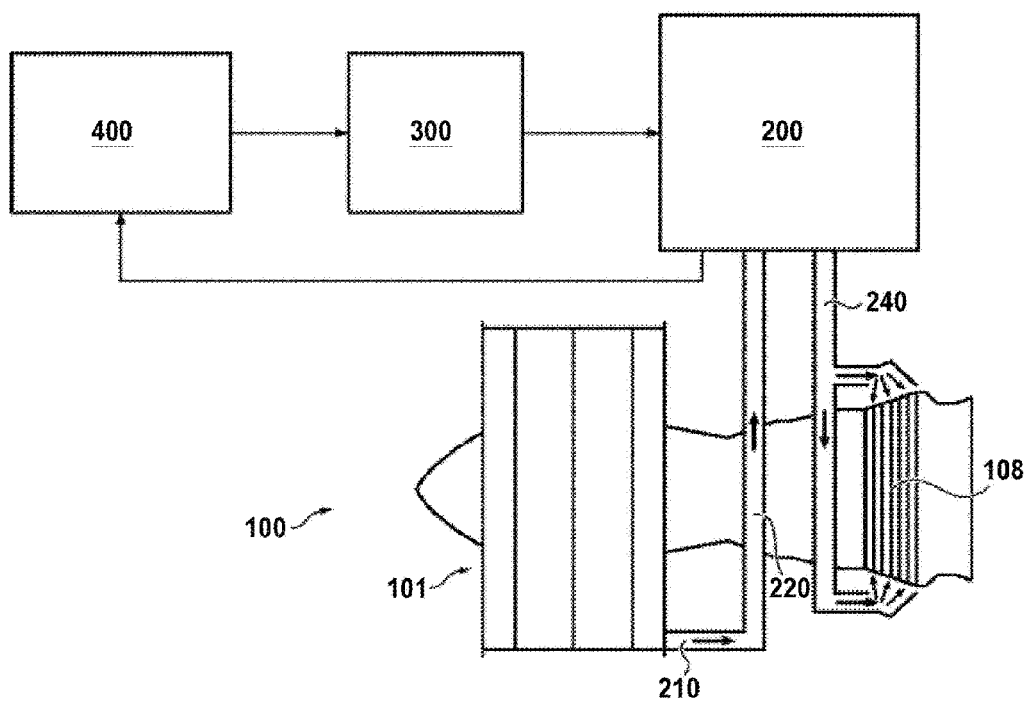
FIG. 2 schematically represents the architecture of the environment of a control valve of LTPACC type and its active control, as known in the prior art.

For the remainder of the description, it is considered that the control valve to which reference is made for the invention allows for a general configuration in accordance with the prior art. By way of example without any limitation whatsoever, such a general configuration has been described above with reference to FIG. 2, the numbers of which are repeated here. At the very least, it is here briefly recalled that said valve 200 is able to control the blade sets of the low pressure turbine 106 equipping the bypass turbomachine 100. Moreover, an aircraft including said turbomachine 100 equipped with the control valve 200 also comprises a computing unit 400 configured for the command of said control valve 200.

Figures 6, 7:
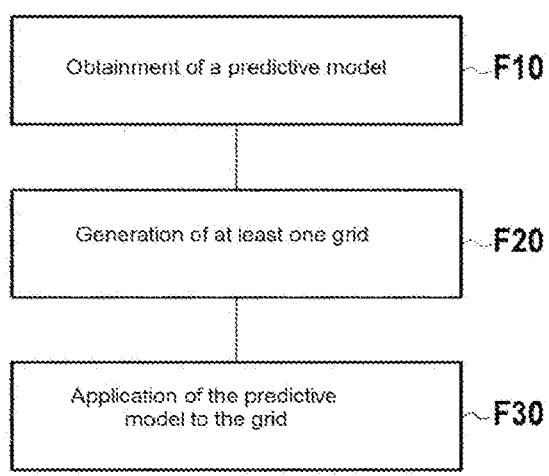
FIG. 6 represents a flow chart of a mode of implementation, according to the invention, of a method for determining at least one table of pressure ratios P1/P2.
FIG. 7 schematically represents a table of pressure ratios P1/P2.

FIG. 6 represents a flow chart of a mode of implementation according to the invention, of the method for determining at least one table of pressure ratios P1/P2.

As illustrated in FIG. 6, the method for determining at least one table first includes a step F10 of obtaining the predictive model previously determined for said turbomachine 100.

Next, said method includes a step F20 for generating at least one empty two-dimensional grid of predetermined size, one dimension of which corresponds to values of Mach number M of the turbomachine 100, and the other dimension of which corresponds to PCN12R values.

Conventionally, each pair (M, PCN12R), formed by a value of Mach number M and a PCN12R value of the grid can be associated with a node of this grid. This node corresponds to a virtual location on the grid positioned at the intersection of the M and PCN12R values which are associated with it.

It should be noted that the fact that the grid is of predetermined size stems from constraints on software development and on capacity of storage of the computing unit 400. For example, it includes as input six Mach M values as well as ten PCN12R values, so as to include sixty nodes respectively associated with the sixty pairs that can be considered based on the values supplied as input to the grid.

Nothing however precludes the consideration of other sizes for the grid, as well as other Mach M and PCN12R values as input. One must nonetheless take into account the fact that such a grid is used to determine a table intended to be implemented in the computing unit 400 of the aircraft. Consequently, it must preferably include as input Mach M values and PCN12R values representative of all the flight phases through which the aircraft is to progress, even more specifically the flight phases corresponding to high engine ratings and to a high Mach number (climb and cruise phases).

Once the grid has been generated, said method includes a step F30 of filling in the grid, each node of the grid being associated with a pressure ratio P1/P2 determined by applying said predictive model to the M and PCN12R values associated with said node.

The grid thus filled in corresponds to a table within the meaning of the invention, thus namely a table of pressure ratios P1/P2 intended to be implemented in the computing unit 400 of the bypass turbomachine 100.

The fact of using the predictive model determined according to the invention is particularly advantageous here insofar as the table directly benefits from the computing accuracy of the model. Furthermore, this accuracy also propagates to the values determined by bilinear interpolation by the computing unit 400 when it is equipped with this table.

FIG. 7 schematically represents an example of a table of pressure ratios P1/P2 intended for the commanding of the control valve 200.

As illustrated by FIG. 7, said table includes as input (vertical dimension) six Mach M values, namely: 0, 0.3, 0.6, 0.75, 0.8, 1. It also includes as input (horizontal dimension) ten PCN12R values, namely nine values between 20% and 100%, in increments of 10%, as well as a value equal to 105%. Said grid thus contains sixty nodes, respectively associated with the pairs (M, PCN12R) supplied as input as well as to values P1/P2 corresponding to the application of the predictive model to these pairs. These values P1/P2 are displayed in the table. For example, the node associated with the pair (M, PCN12R)=(0.8, 60) is also associated with the value P1/P2=0.7479.

Figure 8:
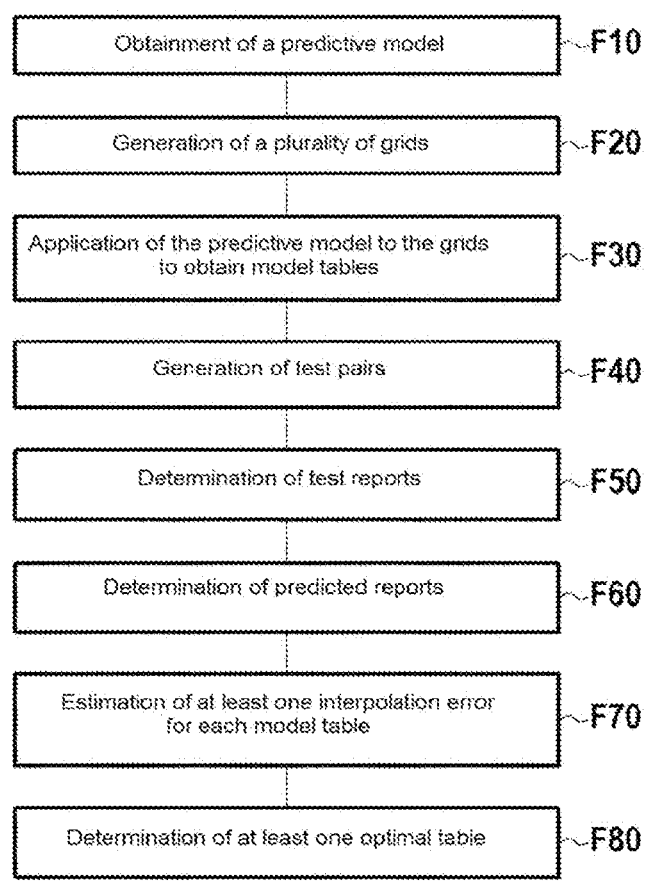
FIG. 8 schematically represents a preferred mode of implementation of the method of FIG. 6.

FIG. 8 schematically represents a preferred mode of implementation of the method of FIG. 6, wherein a plurality of tables is generated in order to be able to identify tables able to accurately describe the operation of the turbomachine 100 in critical conditions (high Mach M and/or high PCN12R rating).

According to this preferred mode of implementation, and as illustrated by FIG. 8, a plurality of empty two-dimensional grids of identical respective sizes is generated during step F20. The generation of these grids is done at random. In other words, the input pairs (M, PCN12R), for the size of grid under consideration, are drawn at random.

One thus obtains, during the step F30, a plurality of tables, so-called "model tables", each model table being determined by applying the predictive model to one of the generated grids.

Once said model tables have been determined, the method includes a step F40 of generating pairs known as "test pairs", each test pair being formed by a value of Mach number M as well as a PCN12R value.

For example, the generation of said test pairs is done at random. Alternatively, said generation is done deterministically at given increments for the M and PCN12R values respectively, or even, yet more specifically, in predetermined respective intervals for said values of M and PCN12R.

Following the generation of the test pairs, the method includes a step F50 of determining, for each model table and for each test pair, a pressure ratio P1/P2, the so-called "test ratio", by bilinear interpolation between pressure ratios P1/P2 contained in said model table. In this way, to each test pair there corresponds a P1/P2 pressure ratio for one of said model tables.

Said method also includes a step F60 of determining pressure ratios P1/P2, so-called "predicted ratios", by applying said predictive model to each test pair.

Thus one now has predicted ratios as well as test ratios respectively associated with the model tables. As there corresponds to each test pair a test ratio (in a model table) and a predicted ratio, it is possible to compare these ratios to one another.

For this purpose said method includes a step F70 of estimating, for each model table, at least one error of interpolation as a function of differences between the predicted ratios associated with said model table and the test ratios, each difference being evaluated for a predicted ratio and a test report associated with one and the same test pair.

The objective of step F70 is therefore to compare test ratios of each model table with the predicted ratios, so as to be able to then judge the relevance of a model table to be described more particularly the operation of the turbomachine 100 during specific flight phases (particularly high Mach number M and/or high PCN12R rating). It will be understood that insofar as the predicted ratios are entirely determined by means of the predictive model, they form values in theory more accurate than those obtained for each model table by means of a bilinear interpolation.

For example, two interpolation errors are estimated for each model table:
- a first interpolation error corresponding to the maximum, as an absolute value, of the differences between the predicted ratios and the test ratios, for test ratios, the associated test pairs of which have a PCN12R value between 91% and 95% as well as a value of Mach number M between 0.79 and 0.89;
- a second interpolation error corresponding to the maximum, as an absolute value, of the differences between the predicted ratios and the test ratios, for test ratios, the associated test pairs of which have a PCN12R value less than 91% as well as a value of Mach number M less than 0.79.

It will therefore be understood that in this exemplary implementation, the first interpolation error of a model table makes it possible to quantify the accuracy of the ratios P1/P2 obtained by bilinear interpolation for high Mach numbers M as well as for high PCN12R ratings. The second interpolation error meanwhile makes it possible to quantify the accuracy of the ratios P1/P2 obtained by bilinear interpolation in the remaining envelope of the model table.

No limitation is attached to the number of interpolation errors that can be envisioned for each model table. The invention thus makes it possible to consider any interval of values for the Mach number M and/or any interval of values for the PCN12R rating, so as to obtain interpolation errors for different areas of a table. Those skilled in the art will know how to define the bounds of these intervals as a function of the flight phases they consider as being of interest.

Finally, said method includes a step F80 of determining, where applicable, from among the model tables, at least one table, the so-called "optimal table", the interpolation error of an optimal table being less, in absolute value, than a predefined threshold value.

The term "determining, where applicable" here refers to the fact that if the threshold value associated with an interpolation error is too low, there is a risk that no model table can be deemed optimal.

For example, by repeating the preceding example, the threshold value associated with said first interpolation error (PCN12R value between 91% and 95% and Mach number M between 0.79 and 0.89) is equal to 0.5%. The threshold value associated with said second interpolation error (PCN12R value less than 91% and a Mach number M less than 0.79) is meanwhile equal to 1.5%.

The choice of such threshold values only constitutes one variant of implementation of the invention. Other threshold values may be envisioned, for example threshold values respectively greater than 0.5% and 1.5% if one wishes to obtain more optimal tables (for example if no optimal table has been able to be determined). Conversely, these threshold values can be lowered to apply a stricter optimality criterion, and thus limit the number of optimal tables able to be obtained.

The implementation of the method described with reference to FIG. 8 is therefore particularly advantageous in that it offers the possibility of obtaining optimal tables with fine meshes for flight phases during which it is crucial to accurately evaluate the pressures P1 (high Mach number M and/or high PCN12R rating), in order for the computing unit 400 to accurately command the control valve 200.

It will moreover be understood that the greater the number of grids and the number of test pairs generated, the more it is possible to obtain optimal tables with fine meshes in the envelopes (Mach number M, PCN12R rating) considered as being of interest.

This is further reinforced when the number of test pairs generated is greater than the number of grids generated randomly.

By way of example without any limitation whatsoever, the number of test pairs generated is ten times greater than the number of two-dimensional grids generated at random. For example, the number of test pairs is equal to 10^6, and the number of grids is equal to 10^5.

Nothing however precludes the use of different numbers of test pairs and grids, according to other examples not detailed here.

The invention claimed is:

1. A method comprising:
   determining a table of pressure ratios P1/P2 intended to command a valve for controlling sets of blades of a low pressure turbine equipping a bypass turbomachine, said turbomachine comprising a primary air path and a secondary air path separated by an inter-path compartment, P1 pressure corresponding to an air pressure inside said inter-path compartment, and P2 pressure corresponding to an air pressure in the secondary air path, said determining comprising:
      obtaining a predictive model of a pressure ratio P1/P2 for said turbomachine by
         acquiring, by acquiring means and on a test turbomachine in operation corresponding to the bypass turbomachine, at respective measurement times, sets of measurements each comprising a P1 measurement of the P1 pressure, a P2 measurement of the P2 pressure, a measurement M of a Mach number of the test turbomachine, and a PCN12R measurement representing a low pressure rating of the test turbomachine,
         obtaining said sets of measurements by a processing device,
         supervised learning, by the processing device and based on said sets of measurements obtained, of a predictive model of the ratio P1/P2 as a function of the M number and of the PCN12R rating considered as explanatory variables,
      generating at least one empty two-dimensional grid of predetermined size, one dimension of which corresponds to values of Mach number M of the turbomachine, and the other dimension of which corresponds to PCN12R values representing a low pressure rating of the turbomachine, and
      filling in the grid, each node of the grid being associated with a pressure ratio P1/P2 determined by applying said predictive model to the M and PCN12R values associated with said node, the grid thus filled in forming a table of pressure ratios P1/P2; and
   commanding the valve to control the sets of blades of the low pressure turbine equipping the bypass turbomachine based on the table of pressure ratios P1/P2.

2. The method as claimed in claim 1, wherein a plurality of empty two-dimensional grids of identical respective sizes is generated at random during the generating at least one grid, so as to obtain a plurality of tables of pressure ratios P1/P2, called "model tables", corresponding respectively to said grids filled in during the filling-in, said method further comprising:
   generating pairs, called "test pairs", each test pair being formed by a value of Mach number M as well as a PCN12R value,
   determining, for each model table and for each test pair, a P1/P2 pressure ratio, called "test ratio", by bilinear interpolation between P1/P2 pressure ratios contained in said model table,
   determining P1/P2 pressure ratios, called "predicted ratios", by applying said predictive model to each test pair,
   estimating, for each model table, at least one interpolation error as a function of differences between the predicted ratios associated with said model table and the test ratios, each difference being evaluated for a predicted ratio and a test ratio associated with one and the same test pair, and
   determining, where applicable, from among the model tables, at least one table, called "optimal table", the interpolation error of an optimal table being less, as an absolute value, than a predefined threshold value.

3. The method as claimed in claim 2, wherein two interpolation errors are estimated for each model table:
   a first interpolation error corresponding to a maximum, as an absolute value, of the differences between the predicted ratios and the test ratios, for test ratios for which the test pairs associated have a PCN12R value between 91% and 95% along with a value of Mach number M between 0.79 and 0.89, the threshold value associated with said first interpolation error being equal to 0.5%;
   a second interpolation error corresponding to the maximum, as an absolute value, of the differences between the predicted ratios and the test ratios, for the test ratios for which the associated test pairs have a PCN12R value less than 91% along with a value of Mach number M less than 0.79, the threshold value associated with said second interpolation error being equal to 1.5%.

4. A computing unit configured to execute the method as claimed in claim 1.

5. An aircraft comprising:
   a bypass turbomachine,
   a valve for controlling sets of blades of a low pressure turbine equipping said turbomachine,
   a computing unit as claimed in claim 4.

* * * * *